US009227225B2

(12) United States Patent
Evarts

(10) Patent No.: US 9,227,225 B2
(45) Date of Patent: Jan. 5, 2016

(54) BEARING COOLING SYSTEM FOR VIBRATORY DEVICES

(71) Applicant: American Piledriving Equipment, Inc., Kent, WA (US)

(72) Inventor: Kingsley S. Evarts, Montgomery, TX (US)

(73) Assignee: American Piledriving Equipment, Inc., Kent, WA (US)

( * ) Notice: Subject to any disclaimer, the term of this patent is extended or adjusted under 35 U.S.C. 154(b) by 398 days.

(21) Appl. No.: 13/782,938

(22) Filed: Mar. 1, 2013

(65) Prior Publication Data

US 2014/0245845 A1 Sep. 4, 2014

(51) Int. Cl.
*B06B 1/16* (2006.01)
*F28D 15/00* (2006.01)

(52) U.S. Cl.
CPC . *B06B 1/16* (2013.01); *F28D 15/00* (2013.01); *Y10T 74/18344* (2015.01)

(58) Field of Classification Search
CPC ............... F16N 7/18; F16N 7/36; B06B 1/16
USPC .............................................. 184/6.22, 104.3
See application file for complete search history.

(56) References Cited

U.S. PATENT DOCUMENTS

| 3,616,542 | A | * | 11/1971 | Rader ............................. 34/287 |
| 3,948,354 | A | * | 4/1976 | Fosse et al. .................. 184/6.22 |
| 4,861,252 | A | * | 8/1989 | Grau ............................. 425/135 |
| 6,871,628 | B1 | * | 3/2005 | Tauer ...................... 123/196 AB |
| 6,929,421 | B2 | * | 8/2005 | Potts et al. ..................... 404/117 |
| 6,997,238 | B1 | * | 2/2006 | Ruthy et al. .................... 165/41 |
| 8,292,116 | B2 | * | 10/2012 | Saito ............................. 220/563 |

FOREIGN PATENT DOCUMENTS

| CN | 201618682 | 11/2010 |
| FR | 2775732 | 4/2000 |
| JP | 10-43685 | 2/1998 |

OTHER PUBLICATIONS

American Piledriving Equipment, Inc.; Line Bored Cooling System for a Vibratory Hammer, Drawing included to identify the nature of the device offered for sale (not published before offer of sale); Aug. 12, 2005.

* cited by examiner

*Primary Examiner* — William E Dondero
*Assistant Examiner* — Mark K Buse
(74) *Attorney, Agent, or Firm* — Madson IP, P.C.

(57) ABSTRACT

An bearing cooling system is connected to and actuated by the vibration of a vibratory device to pump lubricant to lubricate internal components of the vibratory device. The bearing cooling system has a bottom end cap with an inlet in fluid communication with the vibratory device, a top end cap with an outlet for delivering the lubricant to lubricate components of the vibratory device, a tube disposed between and sealingly engaging the bottom end cap and the top end cap, and a piston having a lubricant passageway. The piston is slidably disposed within the tube downstream of the bottom end cap and upstream of the top end cap. Vibration of the vibration device causes the piston to oscillate within the tube to draw lubricant from the vibration device which passes through the lubricant passageway in the piston, and delivers lubricant to lubricate internal components of the vibration device. Upstream of the top end cap a heat exchanger and/or a filter can be used to cool and/or remove debris from the lubricant before lubricating the internal components.

18 Claims, 8 Drawing Sheets

BEARING COOLING SYSTEM FOR VIBRATORY DEVICES

TECHNICAL FIELD

The present invention relates generally to cooling systems used to draw heat from moving parts in equipment. More specifically, the present invention relates to a cooling system that draws heat away from the bearings and facilitates cooling the lubricant used in the lubrication of vibratory equipment such as pile drivers, wick drain devices and the like.

BACKGROUND

Most vibratory devices, such as material tamping devices, pile drivers, vibrating tables, wick drain devices and fruit-tree shakers and the like, create desirable vibration by rotating eccentrics. In these devices, due to the wear and tear and heat resulting from vibrating machinery, it is desirable to have continuous lubrication of various internal components such as the meshing gears, bearings, and the eccentrics. Such lubrication serves to cool the intermeshing and interacting internal components that generate heat by their movement and interactions between parts. In much the same way as an automobile engine will cease up without oil to lubricate and cool the engine, pile drivers, wick drains and the like would quickly overheat and possibly cease up without lubrication to cool and lubricate its internal parts. Heretofore, the continuous lubrication used to cool and lubricate a pile driver or vibratory wick drain device has been of two types, one by fluttering and the other by nebulization.

Generally, "nebulized" lubrication involves throwing lubricant sprays onto the bearings and other components susceptible to heat and wear. The excess lubricant (e.g., oil) is collected in a recovery basin and then returned from the basin to the spraying nozzles by a motorized pump. This type of lubrication is performed in a free atmosphere. In some embodiments of nebulized lubrication, the bearings are force-lubricated by directing the lubricant directly into sealed bearings and returning excess lubricant to a recovery basin that is separated from the interior of the gear box by a wall that keeps the lubricant out of the interior of the gear box.

A drawback to nebulized lubrication is that it typically requires a vibration-tolerant motor to drive the pump, which adds significant weight and cost to the system and requires a power source for the motor, reducing the overall efficiency of the vibratory device. Additionally, because the meshing gears, bearings, and eccentrics are enclosed within the gear box, they are hidden from the operator's view. Consequently, if the motorized pump or any part of the pumping system fails, the operator frequently will not know of the failure until after serious damage to the vibratory device has occurred. Vibratory devices have been known to cease up due to lack of lubrication when the lubricant pumping system unknowingly fails.

Lubrication "by fluttering" has been performed both in a free atmosphere and under vacuum. Generally, this type of lubrication involves driving the eccentrics into rotation within a lubricant container or reservoir. The lubricant is thrown by the centrifugal force of the eccentrics. Particularly with eccentrics that have a semi-circular profile, rotation of the eccentric around its axis causes the eccentric to impact against the lubricant within the container or reservoir. This causes lubricant splash within the gear box (or housing) and forces the lubricant against the interior walls of the gear box. At startup of the vibratory device, this impact is generally rather strong, although it depends on the diameter of the eccentric, its thickness, and the level of and viscosity of the lubricant. Such impact, retards the rotating momentum of the eccentric and absorbs energy making the vibratory device less efficient than it could be if this impact were significantly reduced or eliminated. So long as the lubricant is regularly changed and appropriate levels of lubricant are maintained, the lubricant is always present within the gear box. However, during operation of the vibratory device following startup, the lubricant is so violently agitated, both by the vibration and from eccentric impact, that much, if not all, of the lubricant becomes a fine mist of lubricant globules suspended within the interior volume of the gear box.

Because the bearings are most susceptible to overheating and wear, lubrication of the bearings is usually the highest priority with vibratory devices. Although the fine mist of lubricant lubricates the internal components of the vibratory device, including the bearings, the gear box is an enclosure that holds the heat generated within the gear box. With most uses of vibratory devices the rapid heating of the device is not a serious problem because most vibratory devices are designed for intermittent duty (e.g., it takes a short period of time to drive a pile and then the vibratory device is allowed to rest from vibrating and cool down until another pile is attached and ready to be driven). However, the need for continuous duty vibratory devices is increasing. For example, vibratory wick drain devices operate almost continuously because there is such a short time between driving each wick drain. Also, as the advantages and various uses of vibratory devices become better known, the need for continuous duty pile drivers is increasing.

SUMMARY OF THE INVENTION

The vibratory assembly of the present disclosure utilizes a cooling system that does not expose the cooling fluid to the lubricant, so that the cooling fluid will not contaminate the lubricant. Whether the vibratory assembly utilizes "nebulized" lubrication, a lubricant reservoir, or force lubrication, the vibratory assembly can be cooled without contamination. The cooling system can be retrofit to an existing vibratory assembly or it can be implemented during the initial manufacture of the vibratory assembly.

A typical vibratory assembly that contains lubricant comprises an exciter having various internal components and a housing with an interior having a reservoir portion for receiving the lubricant in a lubricant reservoir. The internal components may comprise bearings and at least an eccentric weight rotatable in a clockwise direction and another eccentric weight rotatable in a counter-clockwise direction. The rotation of these eccentric weights causes vibration of the housing. The vibratory assembly of this disclosure also has a cooling system comprising a heat exchanging assembly, a cooling fluid, and a fluid pump. The heat exchanging assembly has at least one surface that is exposed to the interior of the housing and the lubricant contained within the interior of the housing. The heat exchanging assembly has a tortuous pathway not exposed to the interior of the housing. The tortuous pathway is at least a portion of a closed loop conduit through which the fluid flows under the force of the fluid pump.

In one embodiment of the vibratory assembly of the present disclosure, the housing has bearing openings and a bearing cover for each bearing opening. In most exciters, there is a bearing opening and a bearing cover for each bearing used with the rotatable eccentric weights. For exciters with two eccentric weights, there are four bearings typically, two bearings for each eccentric weight. Hence, for exciters with four or six eccentric weights, there are eight or twelve bearings, respectively, two bearings for each eccentric weight.

The heat exchanging assembly comprises at least one bearing jacket manifold having a bearing-side surface, a pressure inlet disposed at a bearing inlet end of the tortuous pathway portion of the closed loop conduit and a return outlet at a bearing outlet end of the tortuous pathway portion of the closed loop conduit. Each bearing jacket manifold is disposed to cover one of the bearing openings and is positioned between the bearing cover and the bearing opening such that the bearing-side surface is exposed to the interior of the housing near the bearing associated with the bearing opening. In this disposition, cooling fluid may flow under the force of the fluid pump into the bearing jacket manifold, through the pressure inlet, along the tortuous pathway, and exits through the return outlet. Further, in this disposition, bearing jacket manifolds are not structurally stressed nor vulnerable to physical harm. Also, the configuration and disposition of the bearing jacket manifolds eliminates transfer of fluid mishaps (i.e., cooling fluid leaking into, mixing with, and contaminating the lubricant).

The bearing jacket manifold is made of a metal having thermal conductivity greater than the thermal conductivity of whatever metal the housing is made. In some embodiments, the thermal conductivity of the metal of which the bearing jacket manifold is made is at least 10% greater that the thermal conductivity of whatever metal the housing is made. By way of example, the metal of which the bearing jacket manifold is made may be selected from a group of metals comprising aluminum, copper, iron, nickel, silver, zinc, and alloys thereof, or any other suitable metal or metal alloy with advantageous conductivity.

Most vibratory assemblies have a housing with a top plate and side walls. Consequently, the heat exchanging assembly may comprise a plate manifold having an underside surface, a plate pressure inlet disposed at a plate inlet end of the tortuous pathway portion of the closed loop conduit and a plate return outlet at a plate outlet end of the tortuous pathway portion of the closed loop conduit. The plate manifold is disposed subtending the top plate between the top plate and the side walls such that the underside surface is exposed to the interior of the housing. In this disposition, the plate manifold will not experience undue stress and the cooling fluid may flow under the force of the fluid pump into the plate manifold, through the plate pressure inlet, along the tortuous pathway, and exits through the plate return outlet. Further, in this disposition, a plate manifold is not structurally stressed nor vulnerable to physical harm. Also, the configuration and disposition of the plate manifold eliminates transfer of fluid mishaps (i.e., cooling fluid leaking into, mixing with, and contaminating the lubricant).

Similarly, the plate manifold is made of a metal having thermal conductivity greater than the thermal conductivity of whatever metal the housing is made. In some embodiments, the thermal conductivity of the metal of which the plate manifold is made is at least 10% greater than the thermal conductivity of whatever metal the housing is made. Again, by way of example, the metal of which the plate manifold is made may be selected from a group of metals comprising aluminum, copper, iron, nickel, silver, zinc, and alloys thereof, or any other suitable metal or metal alloy with advantageous conductivity. Additionally, the underside surface of the plate manifold may have undulations or fins that increase the total surface area of the underside surface that is exposed to the interior of the housing. These undulations or fins can be of any suitable configuration. For example, fins may be transverse or longitudinal ridges, zig-zag ridges, etc.

An exemplary vibratory assembly of the present disclosure may have a housing with a top plate, side walls, at least one bearing opening, a bearing cover for each bearing opening, and a heat exchanging assembly. The heat exchanging assembly has a plate manifold, at least one bearing jacket manifold, and at least one connector that connects the plate manifold to each bearing jacket manifold. The plate manifold has an underside surface, a plate pressure inlet disposed at a plate inlet end of the tortuous pathway portion of the closed loop conduit, and a plate return outlet at a plate outlet end of the tortuous pathway portion of the closed loop conduit. Each bearing jacket manifold has a bearing-side surface, a pressure inlet disposed at a bearing inlet end of the tortuous pathway portion of the closed loop conduit, and a return outlet at a bearing outlet end of the tortuous pathway portion of the closed loop conduit. Each connector connects the plate manifold to a corresponding bearing jacket manifold such that the cooling fluid flowing through the closed loop conduit passes through the plate manifold and the associated bearing jacket manifold. Each connector has a first flow conduit and a second flow conduit. The first flow conduit is configured for transporting cooling fluid from the tortuous pathway portion of the closed loop conduit within the plate manifold to the pressure inlet of the tortuous pathway portion within the corresponding bearing jacket manifold. The second flow conduit is configured for transporting cooling fluid from the return outlet of the tortuous pathway portion of the closed loop conduit within the bearing jacket manifold to the tortuous pathway portion within the plate manifold. The plate manifold is disposed subtending the top plate between the top plate and the side walls such that the underside surface is exposed to the interior of the housing. Each bearing jacket manifold is disposed between one of the bearing openings and a corresponding bearing cover such that the bearing-side surface is exposed to the interior of the housing near the bearing. The cooling fluid flows under the force of the fluid pump through the plate pressure inlet into the tortuous pathway portion of the plate manifold, through the first flow conduit of the connector, into the tortuous pathway portion within one of the bearing jacket manifolds, through the second flow conduit of the connector, into the tortuous pathway portion within the plate manifold, exits through the plate return outlet, and returns to the fluid pump.

The cooling fluid can be any easily pumpable fluid with suitable heat transfer capabilities. By way of example, the cooling fluid can be water, antifreeze, combinations thereof, or any other suitable fluid with favorable heat transfer capabilities.

Further, the cooling system may also comprise at least one of a fluid storage unit, cooling fans, an in-line heat exchanger, or any other feature to assist in removing heat from the cooling fluid.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

The presently preferred embodiments of the present disclosure will be best understood by reference to the drawings, wherein like parts are designated by like numerals throughout. It will be readily understood that the components of the present bearing cooling system for vibratory devices, as generally described and illustrated in the figures herein, could be arranged and designed in a wide variety of different configurations and could be implemented on various other types of vibratory devices. Thus, the following more detailed description of embodiments of the present invention, as represented in FIGS. 1-15, is not intended to limit the scope of the invention, but is merely representative of presently preferred embodiments of the invention.

The word "exemplary" is used herein to mean "serving as an example, instance, or illustration." Any embodiment described herein as "exemplary" is not necessarily to be construed as preferred or advantageous over other embodiments. While the various aspects of the embodiments are presented in drawings, the drawings are not necessarily drawn to scale unless specifically indicated.

In this application, the phrases "connected to", "coupled to", and "in communication with" refer to any form of interaction between two or more entities, including mechanical, capillary, electrical, magnetic, electromagnetic, pneumatic, hydraulic, fluidic, and thermal interactions.

The phrases "attached to", "secured to", and "mounted to" refer to a form of mechanical coupling that restricts relative translation or rotation between the attached, secured, or mounted objects, respectively. The phrase "slidably attached to" refer to a form of mechanical coupling that permits relative translation, respectively, while restricting other relative motions. The phrase "attached directly to" refers to a form of securement in which the secured items are in direct contact and retained in that state of securement.

The term "abutting" refers to items that are in direct physical contact with each other, although the items may not be attached together. The term "grip" refers to items that are in direct physical contact with one of the items firmly holding the other. The term "integrally formed" refers to a body that is manufactured as a single piece, without requiring the assembly of constituent elements. Multiple elements may be integrally formed with each other, when attached directly to each other from a single work piece. Thus, elements that are "coupled to" each other may be formed together as a single piece.

Figure 1:
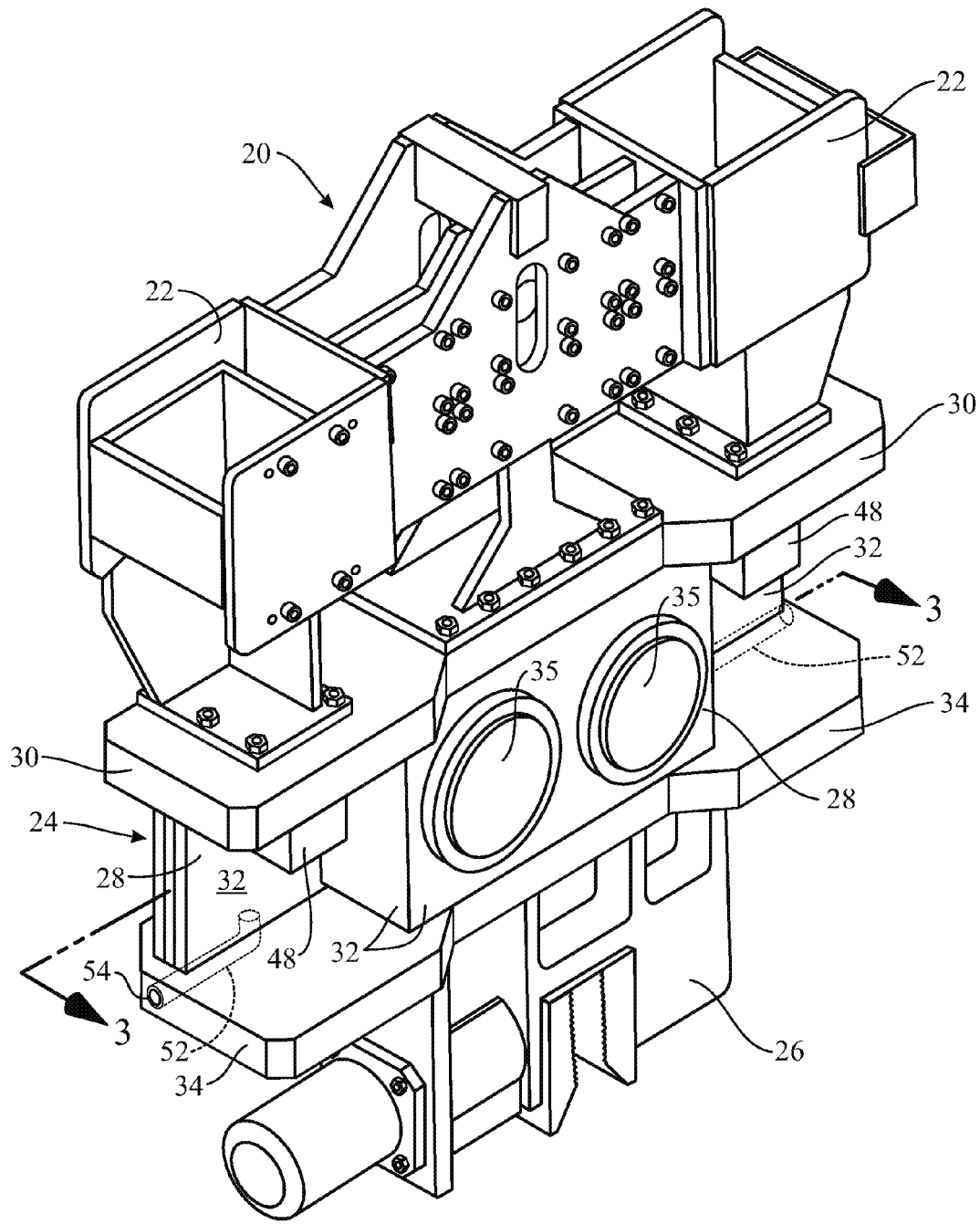
FIG. 1 is perspective view of a known exemplary vibratory assembly showing a suppressor housing, an exciter, and a clamp attachment.
Figure 2:
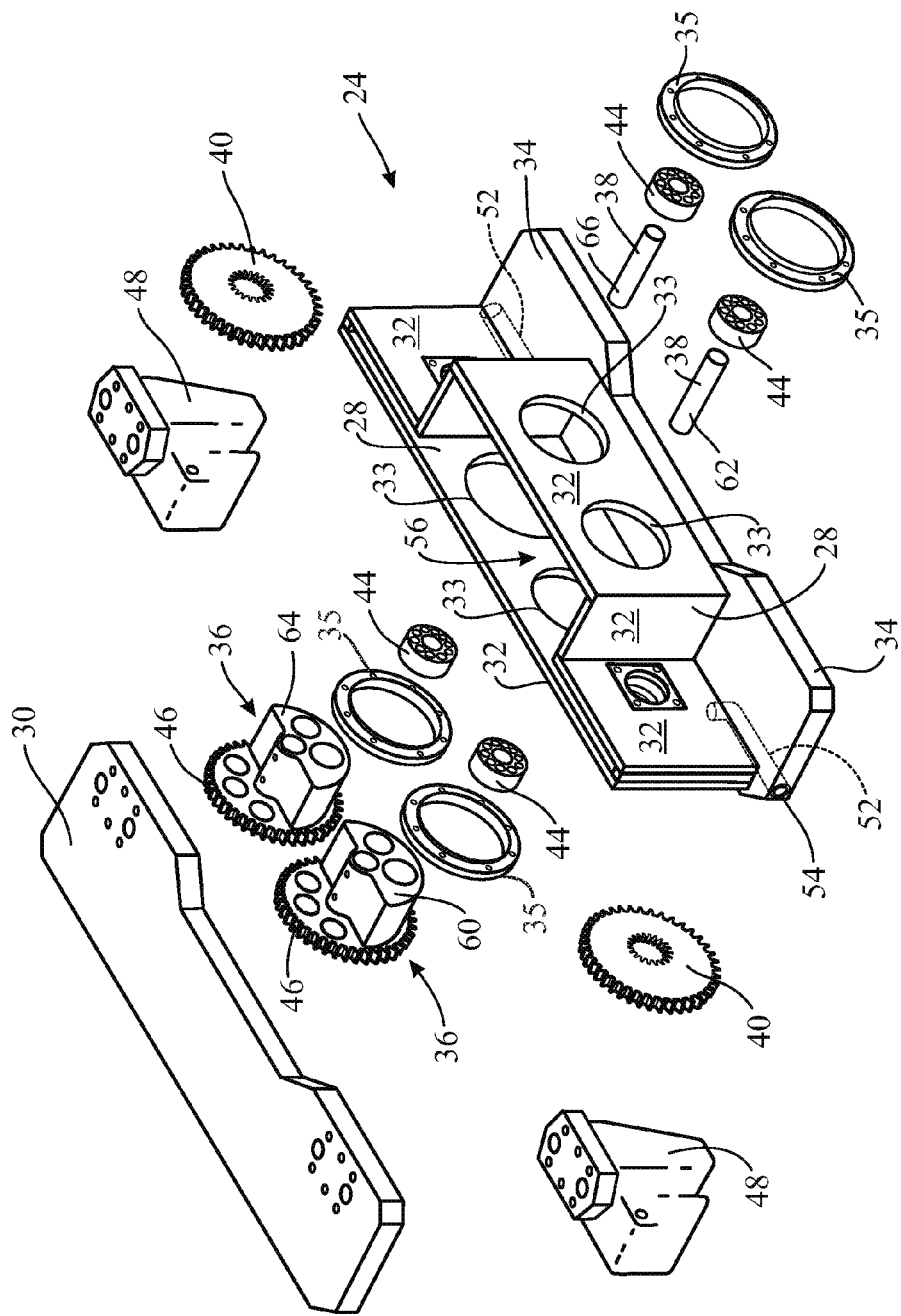
FIG. 2 is an exploded perspective view of the exciter of a known exemplary vibratory assembly with some components omitted for clarity.
Figure 3:
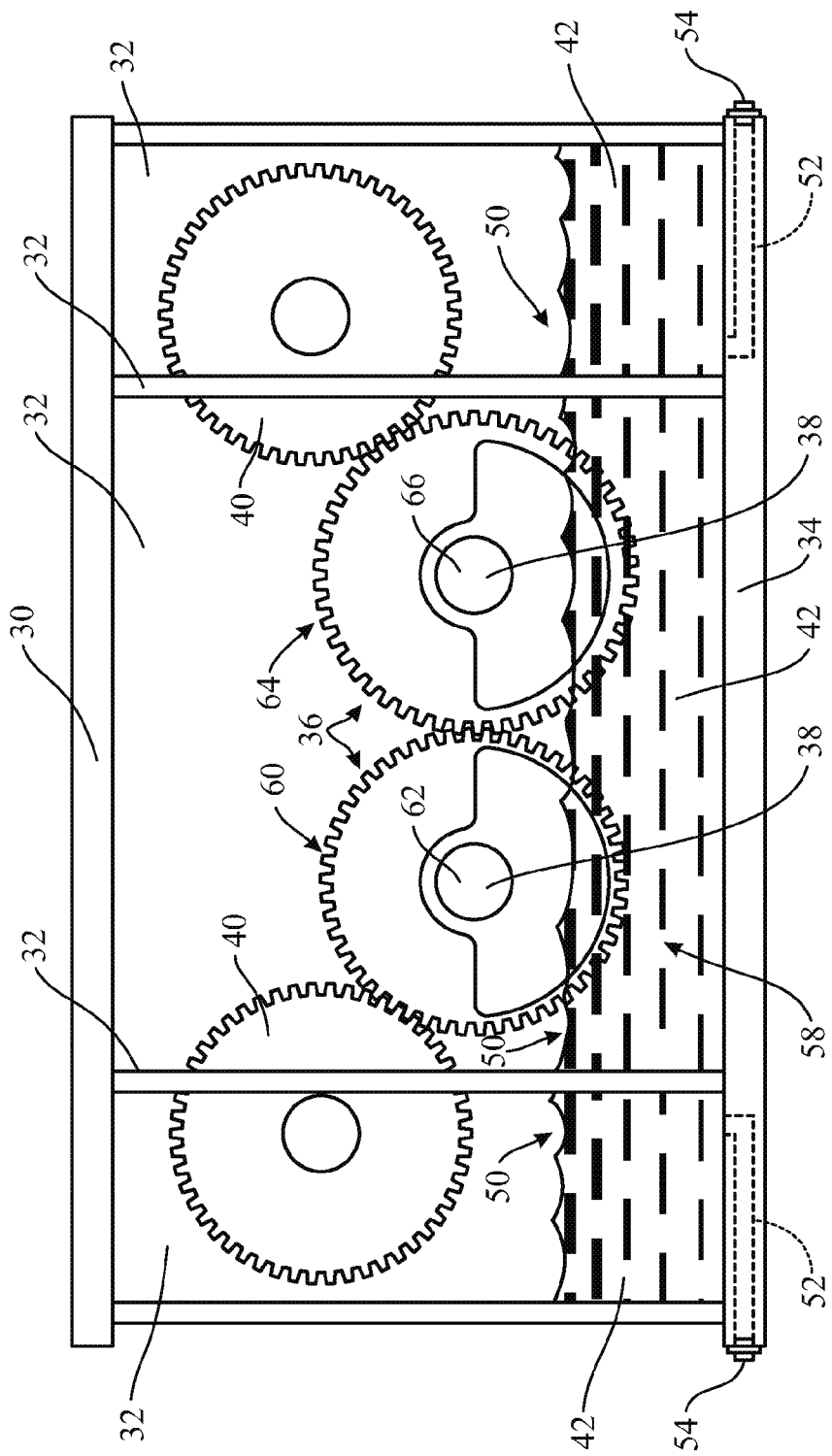
FIG. 3 is a contorted transverse sectional view along line 3-3 of FIG. 1 showing the lubricant reservoir within the housing.

FIGS. 1 and 2 are perspective views of known exemplary vibratory assemblies, provided to demonstrate a representative environment in which the various embodiments of the bearing cooling system of the present disclosure may operate. The bearing cooling system, or a simple modification thereof, will work with most vibratory devices such as material tamping devices, pile drivers, vibrating tables, vibratory wick drain devices and fruit-tree shakers and the like. For clarity of description and brevity, this disclosure will be directed to use of the bearing cooling system on an exemplary vibratory pile driver (shown in FIGS. 1 and 2). A person of ordinary skill in the art will be able to modify and implement embodiments of the bearing cooling system of this disclosure with other vibratory devices.

FIG. 1 is a perspective view of an exemplary vibratory assembly 20 showing a suppressor housing 22, an exciter 24, and a clamp attachment 26. Vibratory assemblies 20 for imparting a vibratory force to a pile typically comprise a suppressor housing 22 to absorb vibration so that it does not travel up the cable to the crane boom, an exciter 24 that creates the vibratory force, and a clamp attachment 26 for connecting the vibratory assembly 20 to the pile to be driven or extracted. The operation and components of vibratory assemblies 20 are well known in the industry and, for brevity, will not be described in detail in this disclosure, except to the extent that the bearing cooling system of this disclosure affects the operation or involves components of the vibratory assembly 20. Routinely, the exciter 24 has a housing 28 (also known as and sometimes referred to herein as a "gear box") with a top plate 30, side walls 32, a bottom plate 34 and bearing covers 35 that houses the eccentrics 36 rotatable on shafts 38 to create vibration, a gear drive 40 to rotate the eccentrics 36, and lubricant 42 (see FIG. 3) to lubricate internal components of the vibratory assembly 20, such as the bearings 44, eccentrics 36, and gears 46. The exciter 24 also has a drive motor 48 that rotates the gear drive 40 that engages the eccentrics 36 in a gear tooth meshing engagement so that the eccentrics 36 rotate at high speed. The vibratory assembly 20 typically has a lubricant reservoir 50 (see FIG. 3) in the bottom portion of the housing 28. At startup, the eccentrics 36 impact the lubricant reservoir 50 with each revolution causing lubricating splash within the interior of the housing 28.

For maintenance purposes, most exciters 24 have some means for draining the lubricant from the housing 28 so that the lubricant 42 can be changed. This draining means can be as simple as a drain hole in the side of the housing 28 or as sophisticated as a gun drilled lubricant drain portal 52 extending within the bottom plate 34 of the housing 28 to a position along the bottom of lubricant reservoir 50. As shown in phantom lines in FIGS. 1-3, exemplary lubricant drain portals 52 are illustrated. During use of the vibratory assembly 20, the lubricant drain portals 52 are closed by plugs 54 secured at the exterior of the housing 28. Hence, during use, the lubricant 42 remains within the housing 28 and the heat generated builds within the housing 28 and is not relieved until the exciter 24 is turned off and can cool.

To drain used lubricant 42 from the vibratory assembly 20 so that the lubricant 42 can be changed out for fresh, clean lubricant 42, the plug(s) 54 is/are removed. Once drained, the plug(s) 54 can be re-secured and the lubricant reservoir 50 can be refilled with fresh, clean lubricant 42. Filling the lubricant reservoir 50 also fills the lubricant drain portal 52 with lubricant 42.

A typical exciter 24 has a housing 28 with an interior 56 having a reservoir portion 58 for receiving the lubricant 42, at least a first eccentric weight 60 secured to a first shaft 62 rotatable in a predetermined direction (either clockwise or counter-clockwise) about the longitudinal axis of the first shaft 62 and a second eccentric weight 64 secured to a second shaft 66 rotatable in an opposite direction (either counter-clockwise or clockwise) about the longitudinal axis of the second shaft 66, a drive motor 48 for rotating the first eccentric weight 60 and the second eccentric weight 64 to cause vibration of the housing 28. Larger exciters 24 may have additional pairs of oppositely rotating eccentrics 36, for example, four or six eccentrics 36 configured in a horizontal line (see for example, FIG. 4) or vertically stacked in pairs are common. Usually, only the lowermost eccentrics 36 impact the lubricant reservoir (see FIG. 3 for context, with most existing vibratory devices, the eccentrics 36 extend well into the lubricant reservoir 50).

Figure 4:
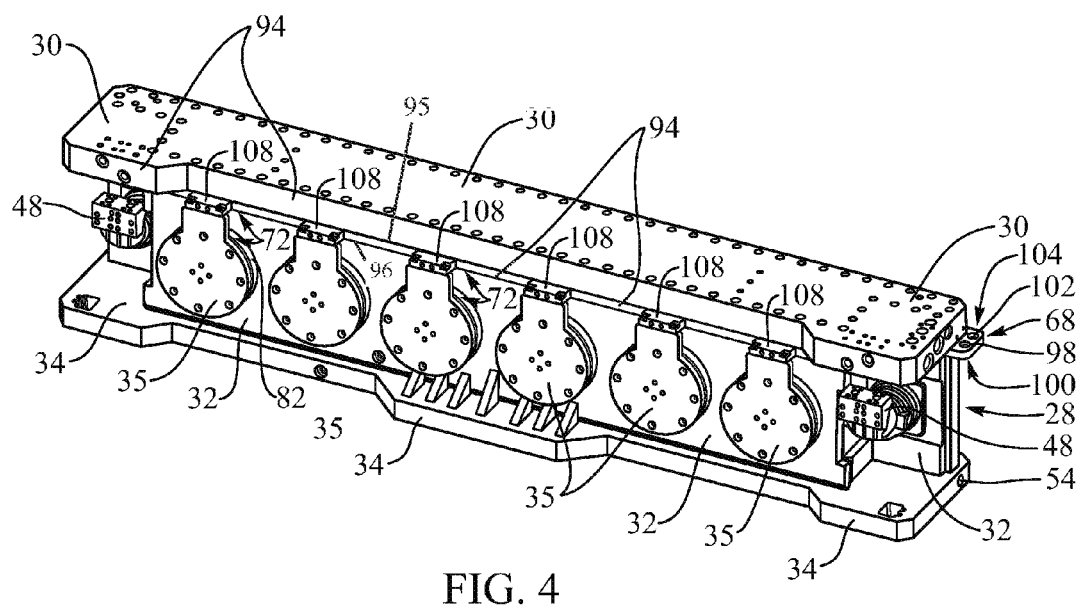
FIG. 4 is a perspective view of an exemplary six-eccentric exciter with a bearing cooling system.
Figure 5:
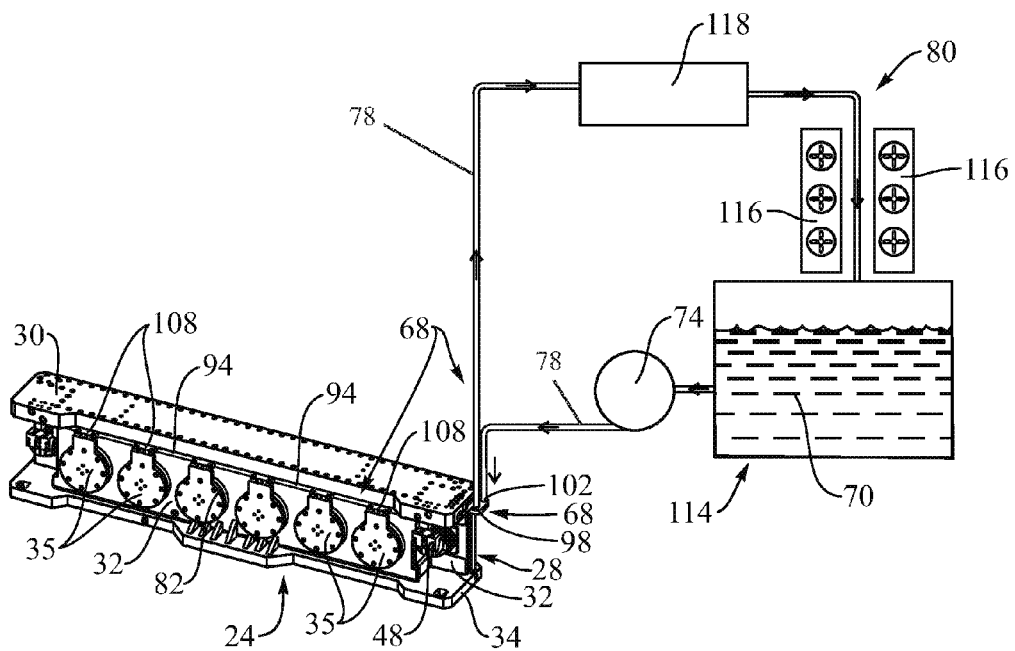
FIG. 5 is a schematic of an exemplary six-eccentric exciter with a bearing cooling system showing examples of the components to assist with the circulation and cooling of the cooling fluid.

An exemplary vibratory assembly 20 of the present disclosure, as best shown in FIGS. 4 and 5, utilizes an exemplary bearing cooling system (generally designated 68) that does not expose the cooling fluid 70 (see FIG. 5) to the lubricant 42, so that the cooling fluid 70 will not contaminate the lubricant 42. For brevity, the vibratory assembly 20 described utilizes a lubricant reservoir 50. However, it should be understood that bearing cooling systems 68 as disclosed and suggested herein can be used with vibratory assemblies 20 with nebulized lubrication, force lubrication, or other types of lubrication with slight modifications that those of ordinary skill in the art could readily make. The bearing cooling system 68 can be retrofit to an existing vibratory assembly 20 or it can be implemented during the initial manufacture of the vibratory assembly 20.

A typical vibratory assembly 20 that contains lubricant 42 comprises an exciter 24 having various internal components and a housing 28 with an interior 56 having a reservoir portion 58 for receiving the lubricant 42 in a lubricant reservoir 50. The internal components may comprise bearings 44 and at least an eccentric weight 36, 60 rotatable in a clockwise direction and another eccentric weight 36, 64 rotatable in a counter-clockwise direction. The rotation of these eccentric weights 36 causes vibration of the housing 28. The vibratory assembly 20 of this disclosure also has a bearing cooling system 68 comprising a heat exchanging assembly (generally designated 72), a cooling fluid 70, and a fluid pump 74. The heat exchanging assembly 72 has at least one surface that is exposed to the interior 56 of the housing 28 and the lubricant 42 contained within the interior 56 of the housing 28. The heat exchanging assembly 72 has a tortuous pathway 76 not exposed to the interior 56 of the housing 28. The tortuous pathway 76 is at least a portion of a closed loop conduit 78 through which the cooling fluid 70 flows under the force of the fluid pump 74.

In one embodiment of the vibratory assembly 20 of the present disclosure, the housing 28 has bearing openings 33 and a bearing cover 35 for each bearing opening 33. In most exciters 24, there is a bearing opening 33 and a bearing cover 35 for each bearing 44 used with the rotatable eccentric weights 36. For exciters 28 with two eccentric weights 36, there are four bearings 44 typically, two bearings 44 for each eccentric weight 36. Hence, for exciters 24 with four or six eccentric weights 36, there are eight or twelve bearings 44, respectively, two bearings 44 for each eccentric weight 36.

Figure 8:
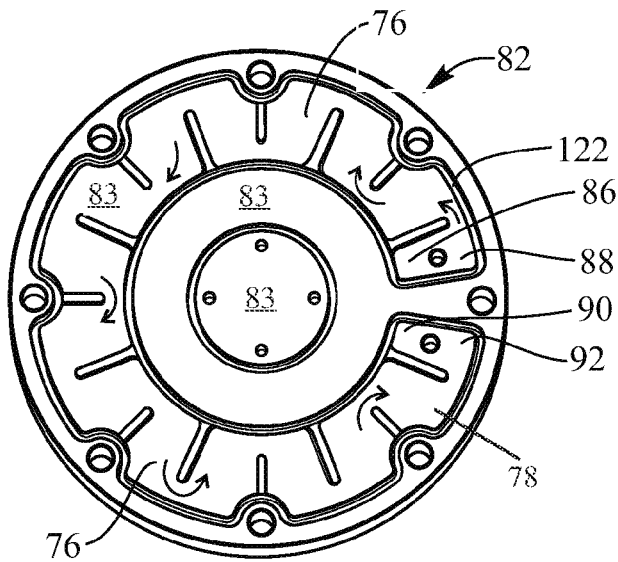
FIG. 8 is a plan view of the pathway side of an exemplary bearing jacket manifold.

The heat exchanging assembly 72 comprises a plate manifold 94 and/or at least one bearing jacket manifold 82. Each bearing jacket manifold 82, as best shown in FIG. 8, has a bearing-side surface 84, a pressure inlet 86 disposed at a bearing inlet end 88 of the tortuous pathway 76 portion of the closed loop conduit 78 and a return outlet 90 at a bearing outlet end 92 of the tortuous pathway 76 portion of the closed loop conduit 78. Each bearing jacket manifold 82 is disposed to cover one of the bearing openings 33 and is positioned between the bearing cover 35 and the bearing opening 33 such that the bearing-side surface 84 is exposed to the interior 56 of the housing 28 near the bearing 44 associated with the bearing opening 33. In this disposition, cooling fluid 70 may flow under the force of the fluid pump 74 into the bearing jacket manifold 82, through the pressure inlet 86, along the tortuous pathway 76, and exits through the return outlet 90. When the exciter 24 is in use, the lubricant 42 will splash against the bearing-side surface 84. This contact of warm or hot lubricant 42 with the bearing-side surface 84 causes a heat transfer from the lubricant 42 to the bearing jacket manifold 82 and then to the cooling fluid 70 circulating through the bearing jacket manifold 82. Heat is thereby removed from the exciter 24 to be dissipated remote from the exciter 24. By so cooling the exciter 24, it may be used for extended periods of time or may even permit continuous duty.

Further, in this disposition, bearing jacket manifolds 82 are not structurally stressed nor vulnerable to physical harm. Also, the configuration and disposition of the bearing jacket manifolds 82 eliminates transfer of fluid mishaps (i.e., cooling fluid 70 leaking into, mixing with, and contaminating the lubricant 42).

The bearing jacket manifold 82 is made of a metal having thermal conductivity greater than the thermal conductivity of whatever metal the housing 28 is made. In some embodiments, the thermal conductivity of the metal of which the bearing jacket manifold 82 is made is at least 10% greater that the thermal conductivity of whatever metal the housing 28 is made. By way of example, the metal of which the bearing jacket manifold 82 is made may be selected from a group of metals comprising aluminum, copper, iron, nickel, silver, zinc, and alloys thereof, or any other suitable metal or metal alloy with advantageous thermal conductivity.

Most vibratory assemblies 20 have a housing with a top plate 30 and side walls 32. Consequently, the heat exchanging assembly 72 may comprise a plate manifold 94 having an underside surface 96, a plate pressure inlet 98 disposed at a plate inlet end 100 of the tortuous pathway 76 portion of the closed loop conduit 78 and a plate return outlet 102 at a plate outlet end 104 of the tortuous pathway 76 portion of the closed loop conduit 78. The plate manifold 94 is disposed subtending the top plate 30 between the top plate 30 and the side walls 32 such that the underside surface 96 is exposed to the interior 56 of the housing 28. In this disposition, the plate manifold 94 will not experience undue stress and the cooling fluid 70 may flow under the force of the fluid pump 74 into the plate manifold 94, through the plate pressure inlet 98, along the tortuous pathway 76, and exits through the plate return outlet 102. When the exciter 24 is in use, the lubricant 42 will splash against the underside surface 96. This contact of warm or hot lubricant 42 with the underside surface 96 causes a heat transfer from the lubricant 42 to the plate manifold 94 and then to the cooling fluid 70 circulating through the plate manifold 94. Heat is thereby removed from the exciter 24 to be dissipated remote from the exciter 24, as will be described below. By so cooling the exciter 24, it may be used for extended periods of time or may even permit continuous duty.

For vibratory pile drivers, a pump 74 that can pump cooling fluid 70 at 20 gallons per minute to 40 gallons per minute should be sufficient to allow continuous duty for the pile driving exciter 24. Of course the pumping rate for the pump 74 will depend on the nature of the vibratory assembly 20 being used, larger units will require an increased rate and smaller unit may work suitably with a lesser rate. A person of ordinary skill in the art will be able to easily determine what rate of cooling fluid 70 flow will be suitable.

Further, in this disposition, a plate manifold 94 is not structurally stressed nor vulnerable to physical harm. Also, the configuration and disposition of the plate manifold 94 eliminates transfer of fluid mishaps (i.e., cooling fluid 70 leaking into, mixing with, and contaminating the lubricant 42).

Similarly, the plate manifold 94 is made of a metal having thermal conductivity greater than the thermal conductivity of whatever metal the housing 28 is made. In some embodiments, the thermal conductivity of the metal of which the plate manifold 94 is made is at least 10% greater than the thermal conductivity of whatever metal the housing 28 is made. Again, by way of example, the metal of which the plate manifold 94 is made may be selected from a group of metals comprising aluminum, copper, iron, nickel, silver, zinc, and alloys thereof, or any other suitable metal or metal alloy with advantageous conductivity. Additionally, the underside surface 96 of the plate manifold 94 may have undulations or fins 106 that increase the total surface area of the underside surface 94 that is exposed to the interior 56 of the housing 28. These undulations or fins 106 can be of any suitable configuration. For example, fins 106 may be transverse or longitudinal ridges, zig-zag ridges, etc.

Figure 6:
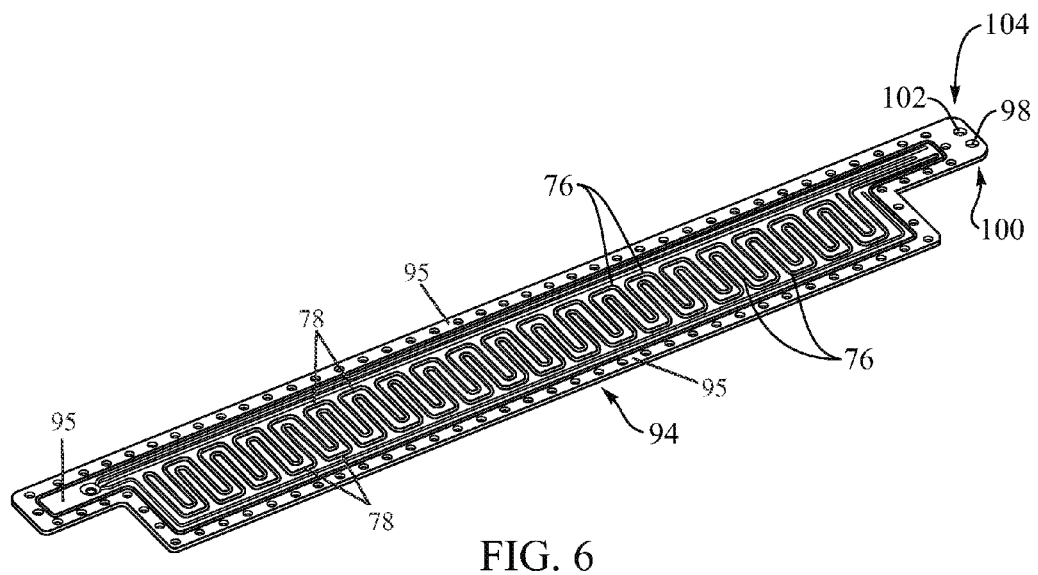
FIG. 6 is a perspective view of the top side of an exemplary plate manifold showing the tortuous pathway.
Figure 7:
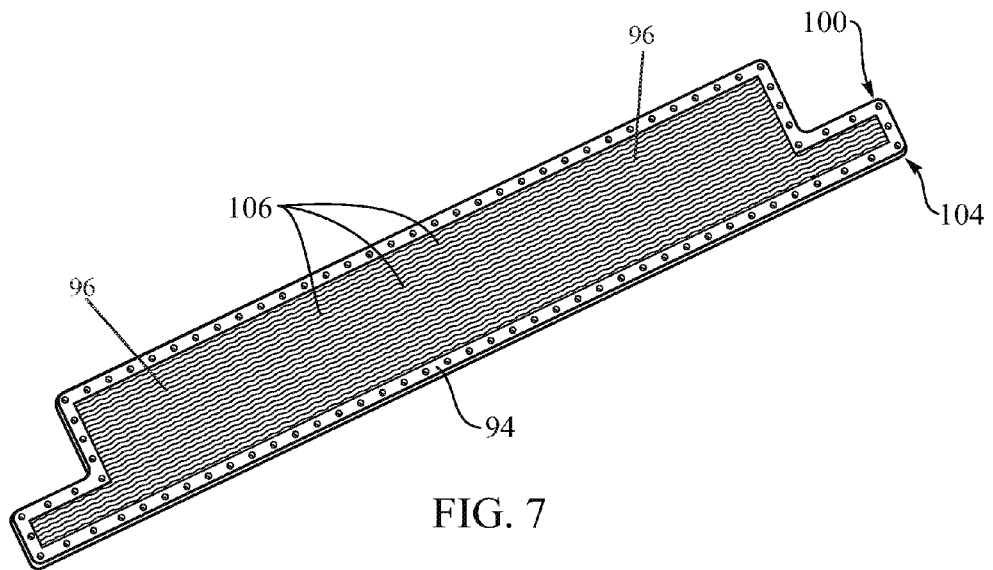
FIG. 7 is a perspective view of the underside of an exemplary plate manifold showing longitudinal fins.

As shown in FIGS. 4 and 5, an exemplary vibratory assembly 20 of the present disclosure may have a housing 28 with a top plate 30, side walls 32, at least one bearing opening 33, a bearing cover 35 for each bearing opening 33, and a heat exchanging assembly 72. The heat exchanging assembly 72 has a plate manifold 94, at least one bearing jacket manifold 82, and at least one connector 108 that connects the plate manifold 94 to each bearing jacket manifold 82. Referring now to FIGS. 6 and 7, the plate manifold 94 has an underside surface 96, a plate pressure inlet 98 disposed at a plate inlet end 100 of the tortuous pathway 76 portion of the closed loop conduit 78, and a plate return outlet 102 at a plate outlet end 104 of the tortuous pathway 76 portion of the closed loop conduit 78. Each bearing jacket manifold 82 has a bearing-side surface 84, a pressure inlet 86 disposed at a bearing inlet end 88 of the tortuous pathway 76 portion of the closed loop conduit 78, and a return outlet 90 at a bearing outlet end 92 of the tortuous pathway 76 portion of the closed loop conduit 78. Each connector 108 connects the plate manifold 94 to a corresponding bearing jacket manifold 82 such that the cooling fluid 70 flowing through the closed loop conduit 78 passes through the plate manifold 94 and each associated bearing jacket manifold 82. Each connector 108 has a first flow conduit 110 and a second flow conduit 112. The first flow conduit 110 is configured for transporting cooling fluid 70 from the tortuous pathway 76 portion of the closed loop conduit 78 within the plate manifold 94 to the pressure inlet 86 of the tortuous pathway 76 portion within the corresponding bearing jacket manifold 82. The second flow conduit 112 is configured for transporting cooling fluid 70 from the return outlet 90 of the tortuous pathway 76 portion of the closed loop conduit 78 within the bearing jacket manifold 82 to the tortuous pathway 76 portion within the plate manifold 94.

The plate manifold 94 is disposed subtending the top plate 30 between the top plate 30 and the side walls 32 such that the underside surface 96 is exposed to the interior 56 of the housing 28. Each bearing jacket manifold 82 is disposed between one of the bearing openings 33 and a corresponding bearing cover 35 such that the bearing-side surface 84 is exposed to the interior 56 of the housing 28 near the associated bearing 35.

The cooling fluid 70 flows under the force of the fluid pump 74 through the plate pressure inlet 98 into the tortuous pathway 76 portion of the plate manifold 94, through the first flow conduit 110 of the connector 108, into the tortuous pathway 76 portion within one of the bearing jacket manifolds 82, through the second flow conduit 112 of the connector 108, into the tortuous pathway 76 portion within the plate manifold 94, exits through the plate return outlet 102, and returns to the fluid pump 74. Since the connectors 108 are exposed to the outside environment encountered by a vibratory assembly 20, it is preferred that the connectors 108 are made of a steel that can withstand the type of wear, tear, and rough handling that a vibratory assembly 20 is likely to experience.

The cooling fluid 70 can be any easily pumpable fluid with suitable heat transfer capabilities. By way of example, the cooling fluid can be water, antifreeze, combinations thereof, or any other suitable fluid with favorable heat transfer capabilities.

Further, as shown in FIG. 5, the bearing cooling system 68 may also comprise a heat removal portion 80 that may comprise at least one of a fluid storage unit 114, cooling fans 116, an in-line heat exchanger 118, or any other feature to assist in removing heat from the cooling fluid 70. It should be understood that multiple fluid storage units 114, cooling fans 116, and in-line heat exchangers 118 can be used and can be used in any combination or configuration. For example, cooling fans 116 could be implemented to cool the cooling fluid 70 within one or more fluid storage units 114 or the fans could be used to cool the cooling fluid 70 passing the closed loop conduit 78 outside of the exciter 24.

Additionally, it should be understood that the bearing cooling system 68 contemplated herein may have a number of different configurations. For example, with some vibratory assemblies 20, the heat exchanging assembly 72 may comprise only a plate manifold 94. With other vibratory assemblies 20, the heat exchanging assembly 72 may comprise only bearing jacket manifolds 82, one or more. With still other vibratory assemblies 20, the heat exchanging assembly 72 may comprise a plate manifold 94, one or more bearing jacket manifolds 82, and a base plate manifold (not shown, but essentially the same as the plate manifold 94 but disposed between the side walls 32 and the bottom plate 34). Such a base plate manifold would likely require one or more drain holes that correspond to and align with any lubricant drain portals 52 that the exciter may have.

Returning to the drawings for additional disclosure, FIG. 4 is a perspective view of an exemplary six-eccentric exciter 24 with a bearing cooling system 68. As depicted, the exciter 24 has six eccentrics 36 (not visible) and a heat exchanging assembly 72 that includes a plate manifold 94 and at least six bearing jacket manifolds 82 (there could be up to six more bearing jacket manifolds 82 on the reverse side of the exciter 24). Connecting each of the bearing jacket manifolds 82 to the plate manifold 94 is a connector 108 through which cooling fluid 70 passes into the bearing jacket manifold 82, through the tortuous pathway 76 of the bearing jacket manifold 82, then out of the bearing jacket manifold 82 back into the plate manifold 94. Under pressure from the fluid pump 74, the cooling fluid 70 enters the plate manifold 94 at the plate pressure inlet 98, circulates through the tortuous pathways 76 of the plate manifold 94 and the bearing jacket manifolds 82, and exits through the plate return outlet 102 to be cooled at the heat removal portion 80 of the bearing cooling system 68. Since the plate manifold 94 and the bearing jacket manifolds 82 are made of a material (e.g., aluminum) having thermal conductivity greater than the material (e.g., steel) of which the housing 28 is made, and the underside surface 96 of the plate manifold 94 and the bearing-side surfaces 84 of each bearing jacket manifold 82 are exposed to the interior 56 of the housing 28 and the lubricant 42 splashing therein, heated lubricant 42 will impact or otherwise contact the underside surface 96 and the bearing-side surfaces 84. During this contact heat will transfer from the heated lubricant 42 to the plate manifold 94 and the bearing jacket manifolds 82, and then to the cooling fluid 70 passing through the manifolds 82, 94. The heat will be carried out of the exciter 24 to be dissipated or otherwise harnessed in the heat removal portion 80.

Oil of the type that serves as a lubricant 42, typically has very poor heat transfer capability by comparison to other fluids. Hence, heat can be removed much more efficiently by circulating a cooling fluid 70 rather than the lubricant 42. Although the cooling fluid 70 can be any fluid with better heat transfer capability than the lubricant 42, it is preferred that the cooling fluid 70 is water, anti-freeze, a combination thereof, or a fluid having similar or better heat transfer capability than water, anti-freeze, or a combination thereof. Additionally, it is preferred that the cooling fluid 70 is more easily pumped by the fluid pump 74 than the lubricant.

FIG. 5 is a schematic of an exemplary six-eccentric exciter 24 with a bearing cooling system 68 showing both an exemplary heat exchanging assembly 72 and a heat removal portion 80. The exciter 24 in FIG. 5 is the same as described above regarding FIG. 4, and that description will not be repeated here. However, FIG. 5 also depicts an exemplary heat removal portion 80 of the bearing cooling system 68.

The arrows show the direction of flow for the cooling fluid 70 through the exemplary heat removal portion 80. The heat removal portion 80 of the bearing cooling system 68 that is depicted illustrates an in-line heat exchanger 118, cooling fans 116, and a fluid storage unit 114. The fluid pump 74 draws cooling fluid 70 from the fluid storage unit 114 and pumps the cooling fluid 70 under pressure through the bearing cooling system 68. As the cooling fluid 70 is pumped into the heat exchanging assembly 72, comprising the plate manifold 94 and the bearing jacket manifold(s) 82, it is relatively cool and capable of drawing heat from the exciter 24, and particularly the bearings 44. Although FIG. 5 depicts a single in-line heat exchanger 118, a single set of cooling fans 116, and a single fluid storage unit 114, it should be understood that any number of these cooling components may be used and they can be configured in any suitable configuration without departing from the spirit of the invention disclosed herein. For example, cooling fans 116 may be positioned to cool the cooling fluid 70 in one or more fluid storage units 114, etc.

FIG. 6 is a perspective view of the top side 95 of an exemplary plate manifold 94 showing an exemplary tortuous pathway 76 that directs the flow of the cooling fluid 70 through the plate manifold 94 from the plate pressure inlet 98 at the plate inlet end 100 ultimately to the plate return outlet 102 at the plate outlet end 104. Since the tortuous pathway 76 is on the top side 95 of the plate manifold 94 which sealed (using a sealing gasket not shown) to the top plate 30 of the exciter 24, there is no danger that the cooling fluid 70 will enter the interior 56 of the housing 28 and contaminate the lubricant 42.

The underside surface 96 of the exemplary plate manifold 94 is shown in FIG. 7. This exemplary plate manifold 94 has longitudinal fins 106. The longitudinal fins 106 increase the surface area of the underside surface 96 that is exposed to the interior 56 of the housing 28 and the splash of lubricant 42 during use of the exciter 24. As heat is generated during the use of the exciter 24, particularly by the bearings 44, the lubricant 42 heats up and is splashed against the underside surface 96. Because the plate manifold 94 is made of a material with better thermal conductivity than the housing 28, heat transfers from the lubricant 42 to the plate manifold 94. During the circulation of the cooling fluid 70 within the closed loop conduit 78 it will pass through the plate manifold 94 and heat is transferred from the plate manifold 94 to the cooling fluid 70. The cooling fluid 70 eventually exits the plate manifold 94 to be cooled at the heat removal portion 80 of the bearing cooling system 68.

Although the underside surface 96 is depicted as longitudinal fins 106, the underside surface 96 of the plate manifold 94 may have any suitable undulations or fins 106 that increase the total surface area of the underside surface 94 that is exposed to the interior 56 of the housing 28. These undulations or fins 106 can be of any suitable configuration. For example, fins 106 may be transverse or longitudinal ridges, zig-zag ridges, etc. or the undulations may be dimples or raised mounds in the surface, etc.

FIG. 8 is a view of the pathway side 83 of an exemplary bearing jacket manifold 82, and the arrows show the direction of the flow of the cooling fluid 70 through an exemplary tortuous pathway 76. Circumscribing the tortuous pathway 76 is a sealing trough 122 into which an elastomeric seal 120 is positioned so that the pathway side 83 of the bearing jacket manifold 82 can sealingly engage the corresponding bearing cover 35. The tortuous pathway 76 directs the flow of the cooling fluid 70 through the bearing jacket manifold 72 from the pressure inlet 86 at the bearing inlet end 88 eventually to the return outlet 90 at the bearing outlet end 92. Since the tortuous pathway 76 is on the pathway side 83 of the bearing jacket manifold 94 which is sealed to the bearing cover 35, there is no danger that the cooling fluid 70 will enter the interior 56 of the housing 28 and contaminate the lubricant 42.

Figure 9:
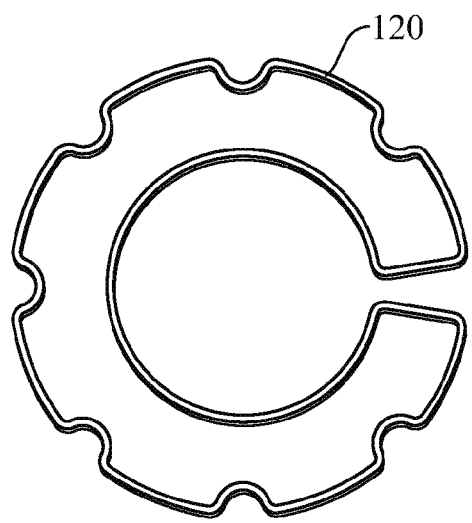
FIG. 9 is a plan view of an elastomeric seal for sealing the connection between the pathway side of an exemplary bearing jacket manifold to a bearing cover.

FIG. 9 depicts an exemplary elastomeric seal 120 for sealing the connection between the pathway side 83 of an exemplary bearing jacket manifold 82 to a bearing cover 35. Such elastomeric seals 120 can be high-pressure water cut to the desired shape that will fit the sealing trough 122. Similarly, an elastomeric seal can be made to seal the connection of the plate manifold 94 to the top plate 30.

Figure 10:
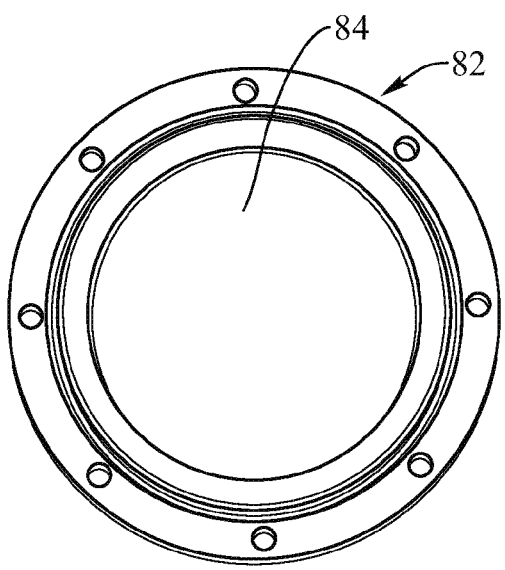
FIG. 10 is a plan view of the bearing side of an exemplary bearing jacket manifold.

The bearing-side surface 84 of the exemplary bearing jacket manifold 82 is shown in FIG. 10. This exemplary bearing jacket manifold 82 has a relatively smooth bearing-side surface 84. However, it should be understood that undulations or fins (similar to those on the underside surface 96 of the plate manifold 94), could be used on the bearing-side surface 84 so long as they do not interfere with the bearings 44 or the rotation of the eccentrics 36. Such undulations or fins would increase the surface area of the ubearing-side surface that is exposed to the interior 56 of the housing 28 and the splash of lubricant 42 during use of the exciter 24. As heat is generated during the use of the exciter 24, particularly by the bearings 44, the lubricant 42 heats up and is splashed against the bearing-side surface 84. Because the bearing jacket manifold 82 is made of a material with better thermal conductivity than the housing 28, heat transfers from the lubricant 42 to the bearing jacket manifold 82. During the circulation of the cooling fluid 70 within the closed loop conduit 78 it will pass through each bearing jacket manifold 82 and heat is transferred from each bearing jacket manifold 82 to the cooling fluid 70. The cooling fluid 70 eventually exits the bearing jacket manifold 82 and the plate manifold 94 to be cooled at the heat removal portion 80 of the bearing cooling system 68.

Figure 11:
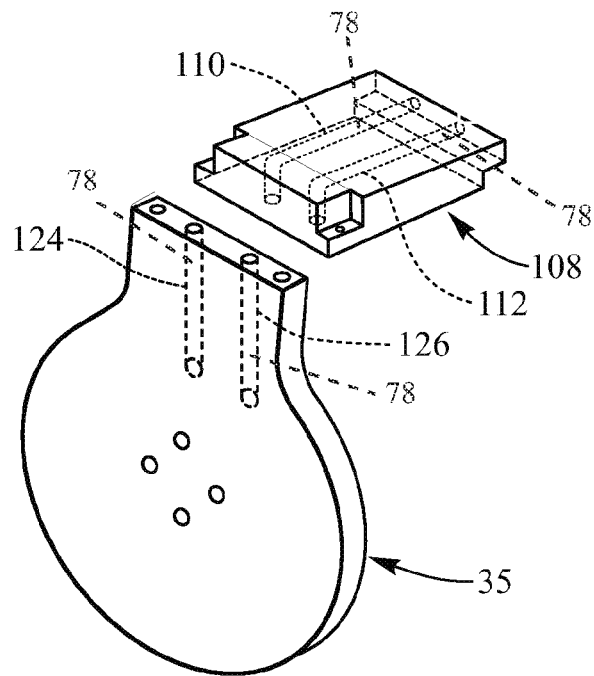
FIG. 11 is a perspective view of the exterior side of a bearing cover and an exemplary connector.

FIG. 11 is a perspective view of the exterior side of an exemplary bearing cover 35 and an exemplary connector 108. The bearing cover 35 depicted is designed to cooperate with the connector 108 to transport cooling fluid 70 from the plate manifold 94 to a corresponding bearing jacket manifold 82 and back to the plate manifold 94 after circulating the cooling fluid 70 through the tortuous path 76 of the bearing jacket manifold 82. The connector 108 has a first flow conduit 110 that conveys the cooling fluid 70 from the plate manifold 94 to an inlet bore 124 in the bearing cover 35 and then to the pressure inlet 86. The connector 108 has a second flow conduit 112 that receives cooling fluid 70 from the return outlet 90 of the bearing jacket manifold 82 via an outlet bore 126 in the bearing cover 35 and delivers it to the plate manifold 94.

Although FIG. 11 shows a connector 108 that connects to the bearing cover 35, it should be understood that the connector 108 could have any suitable shape and could connect directly to the bearing jacket manifold 82 so long as it conveys the cooling fluid 70 into and out of the bearing jacket manifold 82.

Figure 12:
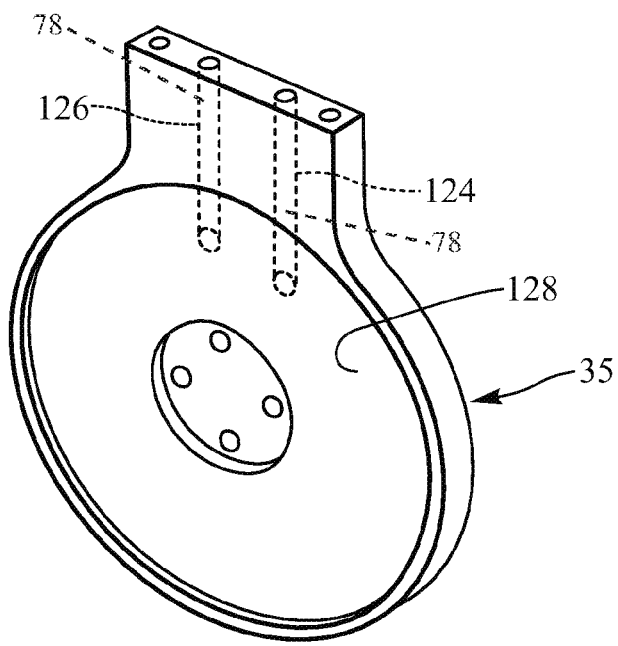
FIG. 12 is a perspective view of the interior side of a bearing cover.

FIG. 12 is a perspective view of the interior side 128 of the bearing cover 35 of FIG. 11, and shows the inlet bore 124 and outlet bore 126 in phantom lines. The interior side 128 sealably engages the pathway side 83 of the bearing jacket manifold 82 and the elastomeric seal 120.

Figure 13:
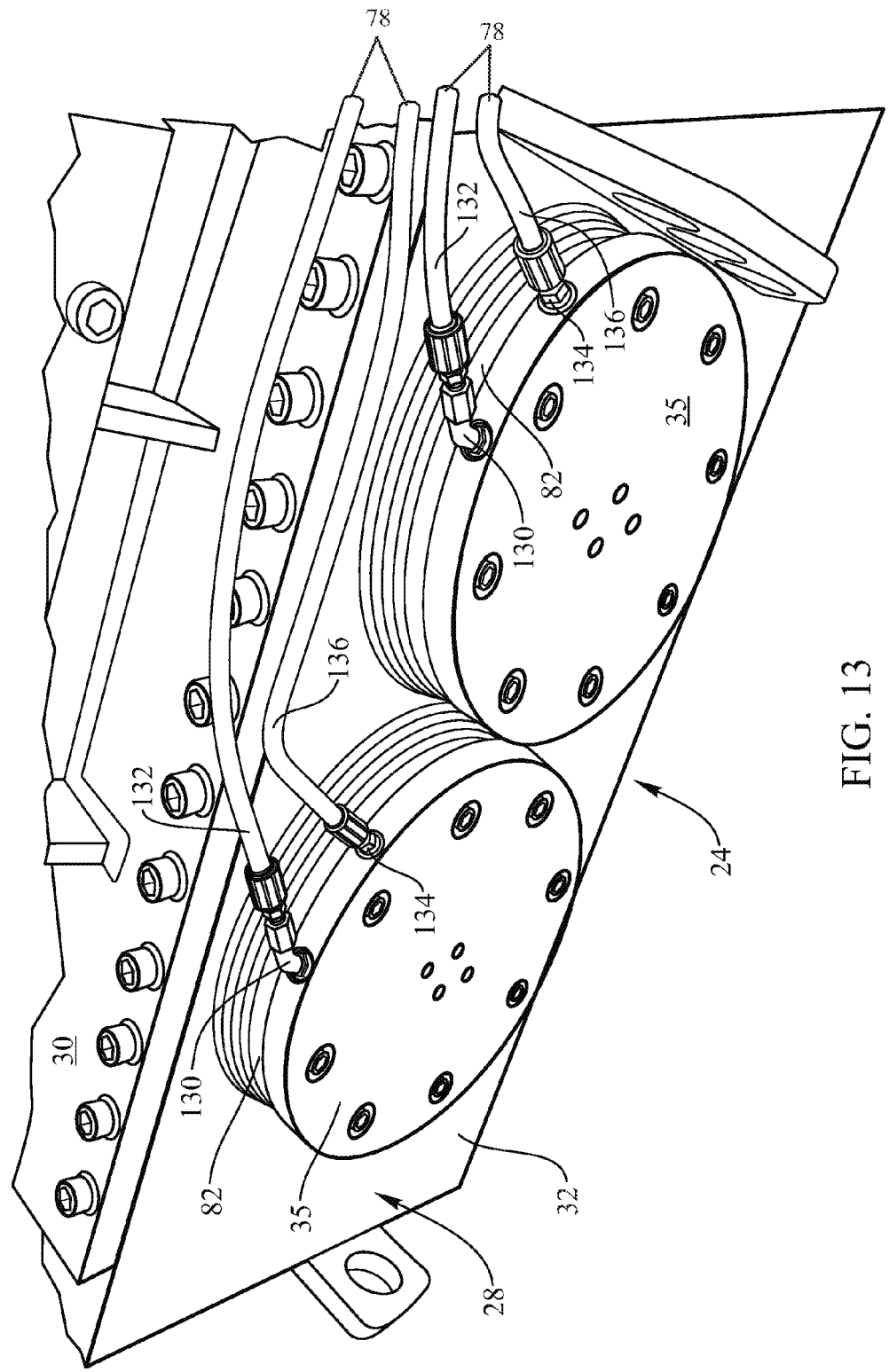
FIG. 13 is a perspective view of an alternative embodiment of a bearing jacket manifold.

FIG. 13 is a perspective view of an alternative embodiment of a bearing jacket manifold 82 wherein an inlet fitting 130, inlet hose 132, outlet fitting 134, and outlet hose 136 connect directly to the bearing cover 35. With this alternative embodiment, no plate manifold 94 is used. The inlet fitting 130, inlet hose 132, outlet fitting 134, and outlet hose 136 are part of the closed loop conduit 78 that circulates the cooling fluid 70. The inlet fitting 130 and the outlet fitting 134 connect to the pressure inlet 86 and return outlet 90, respectively.

Of course, it should be understood that some embodiments may use one or more plate manifolds 94 and no bearing jacket manifolds 82. Also, the configuration of the plate manifold(s) 94 would be determined by the size and shape of the housing 28.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A vibratory assembly for containing lubricant and comprising:
   an exciter having a housing with an interior having a reservoir portion for receiving the lubricant in a lubricant reservoir and internal components, the internal components comprising bearings and at least a first eccentric weight rotatable in a clockwise direction and a second eccentric weight rotatable in a counter-clockwise direction, rotation of the first eccentric weight and the second eccentric weight causing vibration of the housing, the housing further comprises at least one bearing opening and a bearing cover for each bearing opening; and
   a cooling system comprising a heat exchanging assembly, a fluid, and a fluid pump, the heat exchanging assembly having at least one surface being exposed to the interior of the housing and the lubricant contained within the interior of the housing and a tortuous pathway not exposed to the interior of the housing, the tortuous pathway being a portion of a closed loop conduit through which the fluid flows under the force of the fluid pump, the heat exchanging assembly comprises at least one bearing jacket manifold having a bearing-side surface, a pressure inlet disposed at a bearing inlet end of the tortuous pathway portion of the closed loop conduit and a return outlet at a bearing outlet end of the tortuous pathway portion of the closed loop conduit, the at least one bearing jacket manifold being disposed between the at least one bearing opening and the bearing cover such that the bearing-side surface is exposed to the interior of the housing near the bearing, the fluid flows under the force of the fluid pump through the pressure inlet into the tortuous pathway and exits through the return outlet.

2. A vibratory assembly as set forth in claim 1, wherein the bearing jacket manifold is made of a metal having thermal conductivity at least 10% greater than the thermal conductivity of whatever metal the housing is made.

3. A vibratory assembly as set forth in claim 2, wherein the metal of which the bearing jacket manifold is made is selected from the group consisting of aluminum, copper, iron, nickel, silver, zinc, and alloys thereof.

4. A vibratory assembly as set forth in claim 1, wherein the housing further comprises a top plate and side walls and the heat exchanging assembly comprises a plate manifold having an underside surface, a plate pressure inlet disposed at a plate inlet end of the tortuous pathway portion of the closed loop conduit and a plate return outlet at a plate outlet end of the tortuous pathway portion of the closed loop conduit, the plate manifold being disposed subtending the top plate between the top plate and the side walls such that the underside surface is exposed to the interior of the housing, the fluid flows under the force of the fluid pump through the plate pressure inlet into the tortuous pathway and exits through the plate return outlet.

5. A vibratory assembly as set forth in claim 4, wherein the plate manifold is made of a metal having thermal conductivity at least 10% greater than the thermal conductivity of whatever metal the housing is made.

6. A vibratory assembly as set forth in claim 5, wherein the metal of which the plate manifold is made is selected from the group consisting of aluminum, copper, iron, nickel, silver, zinc, and alloys thereof.

7. A vibratory assembly as set forth in claim 4, wherein the underside surface of the plate manifold has fins.

8. A vibratory assembly as set forth in claim 1, wherein the housing further comprises a top plate and side walls, and wherein the heat exchanging assembly further comprises:
   a plate manifold having an underside surface, a plate pressure inlet disposed at a plate inlet end of the tortuous pathway portion of the closed loop conduit and a plate return outlet at a plate outlet end of the tortuous pathway portion of the closed loop conduit;
   and
   at least one connector that connects the plate manifold to the at least one bearing jacket manifold such that the fluid flowing through the closed loop conduit passes through the plate manifold and the at least one bearing jacket manifold, at least one connector having a first flow conduit and a second flow conduit, the first flow conduit for transporting fluid from the tortuous pathway portion of the closed loop conduit within the plate manifold to the pressure inlet of the tortuous pathway portion within the at least one bearing jacket manifold, the second flow conduit for transporting fluid from the return outlet of the tortuous pathway portion of the closed loop conduit within the bearing jacket manifold to the tortuous pathway portion within the plate manifold; and wherein the plate manifold is disposed subtending the top plate between the top plate and the side walls such that the underside surface is exposed to the interior of the housing, and the at least one bearing jacket manifold is disposed between the at least one bearing opening and the bearing cover such that the bearing-side surface is exposed to the interior of the housing near the bearing, the fluid flows under the force of the fluid pump through the plate pressure inlet into the tortuous pathway portion of the plate manifold, through the first flow conduit of the at least one connector, into the tortuous pathway portion within the at least one bearing jacket manifold, through the second flow conduit of the at least one connector, into the tortuous pathway portion within the plate manifold, exits through the plate return outlet, and returns to the fluid pump.

9. A vibratory assembly as set forth in claim 1, wherein the fluid is selected from a group consisting of water, antifreeze, and combinations thereof.

10. A vibratory assembly as set forth in claim 1, wherein the cooling system further comprises at least one of a fluid storage unit, cooling fans, and an in-line heat exchanger.

11. A vibratory assembly for containing lubricant and comprising:

an exciter having a housing with a top plate, side walls, a plurality of bearing openings, and a bearing cover for each bearing opening, and an interior having a reservoir portion for receiving the lubricant in a lubricant reservoir and internal components, the internal components comprising a plurality of bearings and at least a first eccentric weight rotatable in a clockwise direction and a second eccentric weight rotatable in a counter-clockwise direction, rotation of the first eccentric weight and the second eccentric weight causing vibration of the housing; and a cooling system comprising a heat exchanging assembly, a fluid, and a fluid pump, the heat exchanging assembly having at least one surface being exposed to the interior of the housing and the lubricant contained within the interior of the housing and a tortuous pathway not exposed to the interior of the housing, the tortuous pathway being a portion of a closed loop conduit through which the fluid flows under the force of the fluid pump, the heat exchanging assembly comprises:

a plate manifold having an underside surface, a plate pressure inlet disposed at a plate inlet end of the tortuous pathway portion of the closed loop conduit and a plate return outlet at a plate outlet end of the tortuous pathway portion of the closed loop conduit;

a plurality of bearing jacket manifolds, one for each bearing, each having a bearing-side surface, a pressure inlet disposed at a bearing inlet end of the tortuous pathway portion of the closed loop conduit and a return outlet at a bearing outlet end of the tortuous pathway portion of the closed loop conduit; and a plurality of connectors, one for each bearing jacket manifold, that connects the plate manifold to each of the plurality of bearing jacket manifolds such that the fluid flowing through the closed loop conduit passes through the plate manifold and each of the bearing jacket manifolds, each of the plurality of connectors having a first flow conduit and a second flow conduit, the first flow conduit for transporting fluid from the tortuous pathway portion of the closed loop conduit within the plate manifold to the pressure inlet of the tortuous pathway portion within the one of the plurality of bearing jacket manifolds, the second flow conduit for transporting fluid from the return outlet of the tortuous pathway portion of the closed loop conduit within each of the plurality of bearing jacket manifolds to the tortuous pathway portion within the plate manifold; and wherein the plate manifold is disposed subtending the top plate between the top plate and the side walls such that the underside surface is exposed the lubricant within the interior of the housing, and each of the plurality of bearing jacket manifolds is disposed between one of the plurality of bearing openings and one of the bearing covers such that the bearing-side surface is exposed to the interior of the housing near one of the bearings, the fluid flows under the force of the fluid pump through the plate pressure inlet into the tortuous pathway portion of the plate manifold, through the first flow conduit of one of the plurality of connectors, into the tortuous pathway portion within one of the bearing jacket manifolds, through the second flow conduit of the connector, into the tortuous pathway portion within the plate manifold, exits through the plate return outlet, and returns to the fluid pump.

12. A vibratory assembly as set forth in claim 11, wherein the plate manifold is made of a metal having thermal conductivity at least 10% greater than the thermal conductivity of whatever metal the housing is made.

13. A vibratory assembly as set forth in claim 12, wherein the metal of which the plate manifold is made is selected from the group consisting of aluminum, copper, iron, nickel, silver, zinc, and alloys thereof.

14. A vibratory assembly as set forth in claim 11, wherein the underside surface of the plate manifold has fins.

15. A vibratory assembly as set forth in claim 11, wherein the fluid is selected from a group consisting of water, antifreeze, and combinations thereof.

16. A vibratory assembly as set forth in claim 11, wherein the cooling system further comprises at least one of a fluid storage unit, cooling fans, and an in-line heat exchanger.

17. A method for cooling a vibratory assembly during the operation of the vibratory assembly, the vibratory assembly comprising an exciter having a housing with a top plate, side walls, at least one bearing opening and a bearing cover for each bearing opening, and an interior having a reservoir portion for receiving lubricant in a lubricant reservoir and internal components, the internal components comprising at least one bearing, at least a first eccentric weight rotatable in a clockwise direction and a second eccentric weight rotatable in a counter-clockwise direction, rotation of the first eccentric weight and the second eccentric weight causing vibration of the housing, the cooling method comprising the steps of:

providing a heat exchanging assembly, a fluid, and a fluid pump, the heat exchanging assembly comprises at least one surface being exposed to the interior of the housing and the lubricant contained within the interior of the housing, a tortuous pathway not exposed to the interior of the housing, and at least one bearing jacket manifold having a bearing-side surface, a pressure inlet disposed at a bearing inlet end of the tortuous pathway portion of the closed loop conduit and a return outlet at a bearing outlet end of the tortuous pathway portion of the closed loop conduit, the at least one bearing jacket manifold being disposed between the at least one bearing opening and the bearing cover such that the bearing-side surface is exposed to the interior of the housing near the bearing;

actuating the fluid pump to pump fluid through a closed loop conduit that includes the tortuous pathway;

passing the fluid under the force of the fluid pump through the pressure inlet into the tortuous pathway so that the fluid exits through the return outlet;

drawing heat from the interior of the housing by thermal conductivity through the at least one bearing jacket manifold;

heating the fluid as the fluid passes through the tortuous pathway portion of the closed loop conduit within the at least one bearing jacket manifold; and dissipating at least a portion of the heat carried by the fluid remote from the housing.

18. A method for cooling a vibratory assembly as set forth in claim 17, wherein the heat exchanging assembly comprises:

a plate manifold having an underside surface, a plate pressure inlet disposed at a plate inlet end of the tortuous pathway portion of the closed loop conduit and a plate return outlet at a plate outlet end of the tortuous pathway portion of the closed loop conduit, the plate manifold being disposed subtending the top plate between the top plate and the side walls such that the underside surface is exposed to the interior of the housing.

* * * * *